March 15, 1955
A. C. DAVID
2,704,164
BALE LOADING ATTACHMENT FOR VEHICLES
Filed Dec. 11, 1952
4 Sheets-Sheet 1
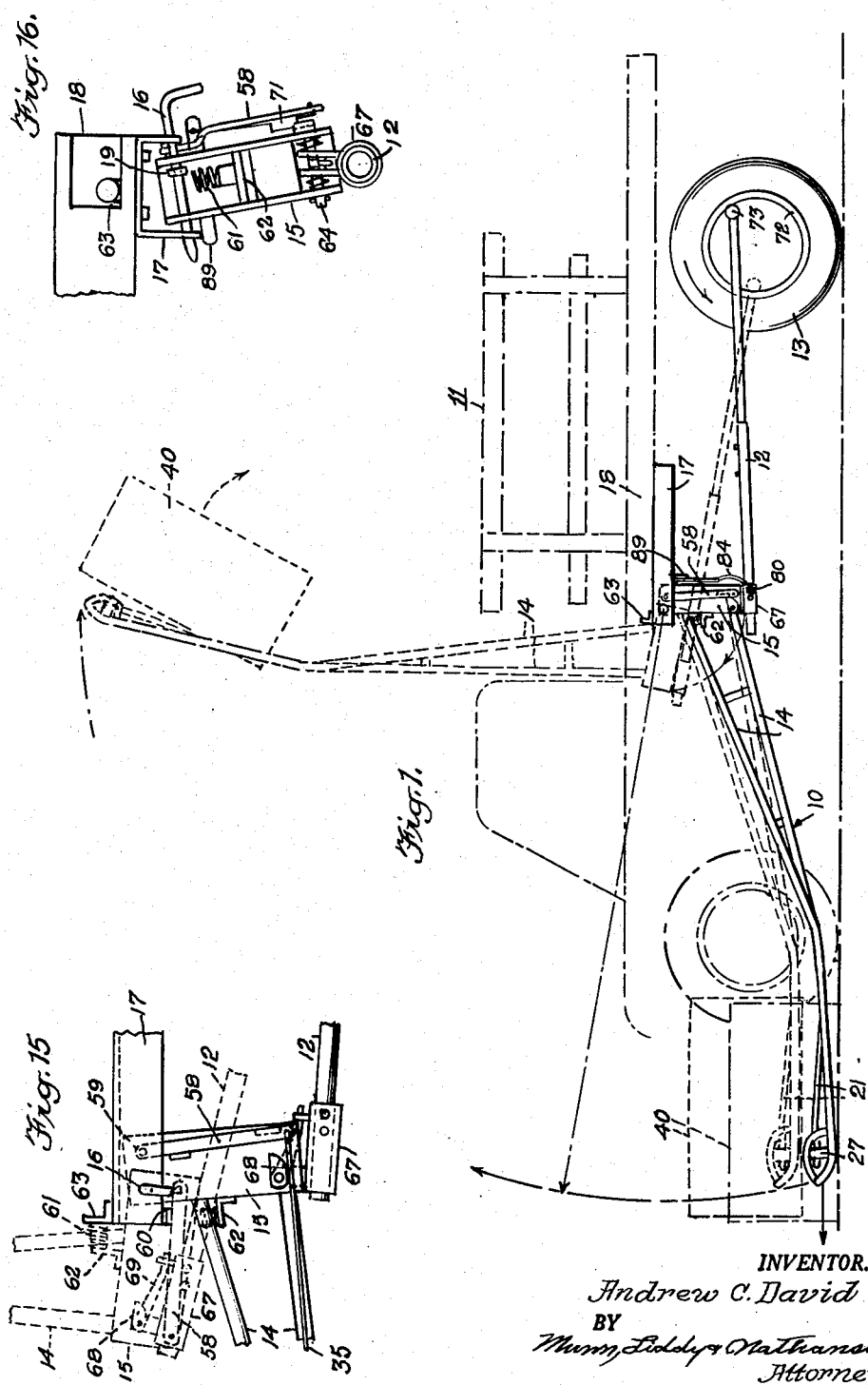
INVENTOR.
Andrew C. David
BY
Munn, Liddy & Nathanson
Attorneys

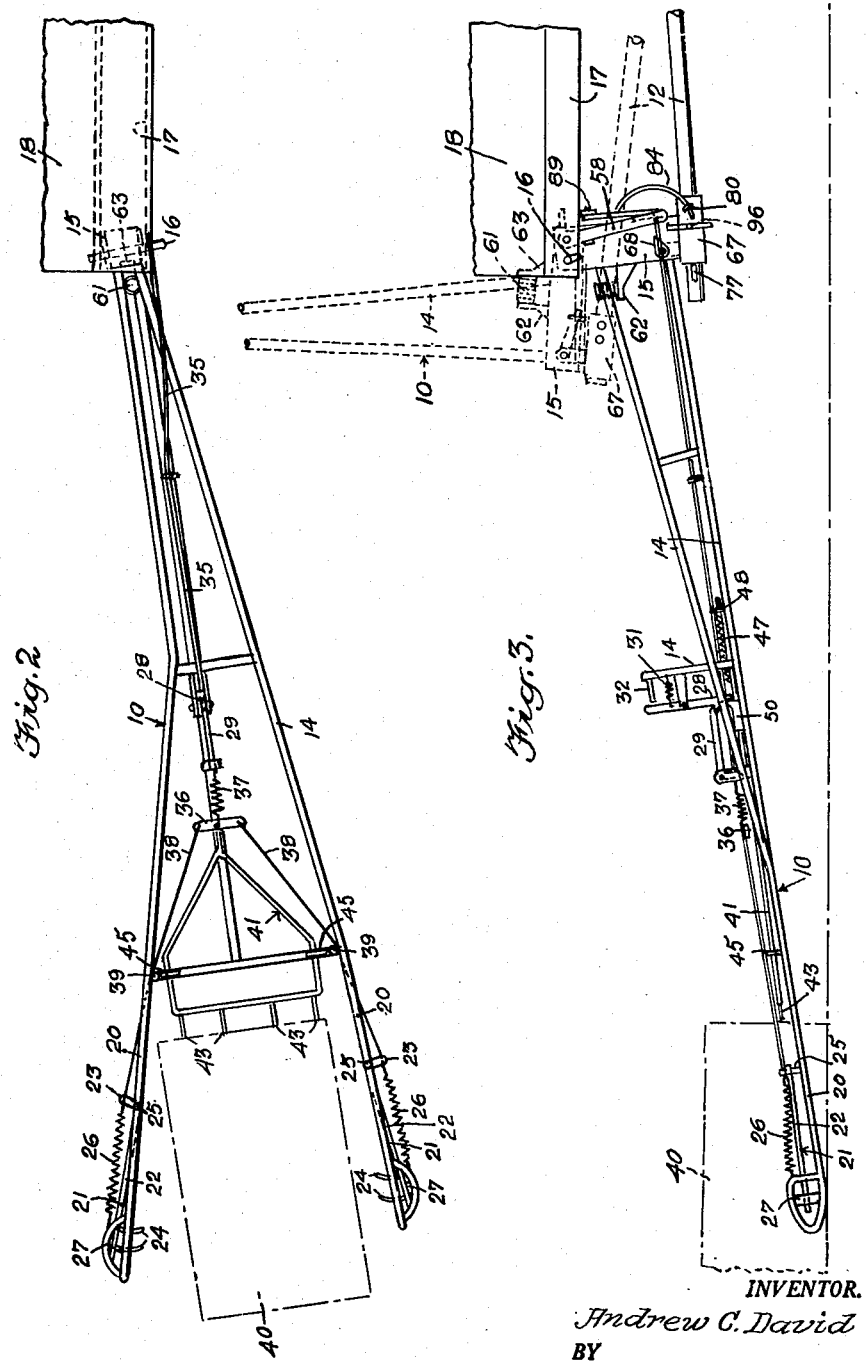

March 15, 1955
A. C. DAVID
2,704,164
BALE LOADING ATTACHMENT FOR VEHICLES
Filed Dec. 11, 1952
4 Sheets-Sheet 3
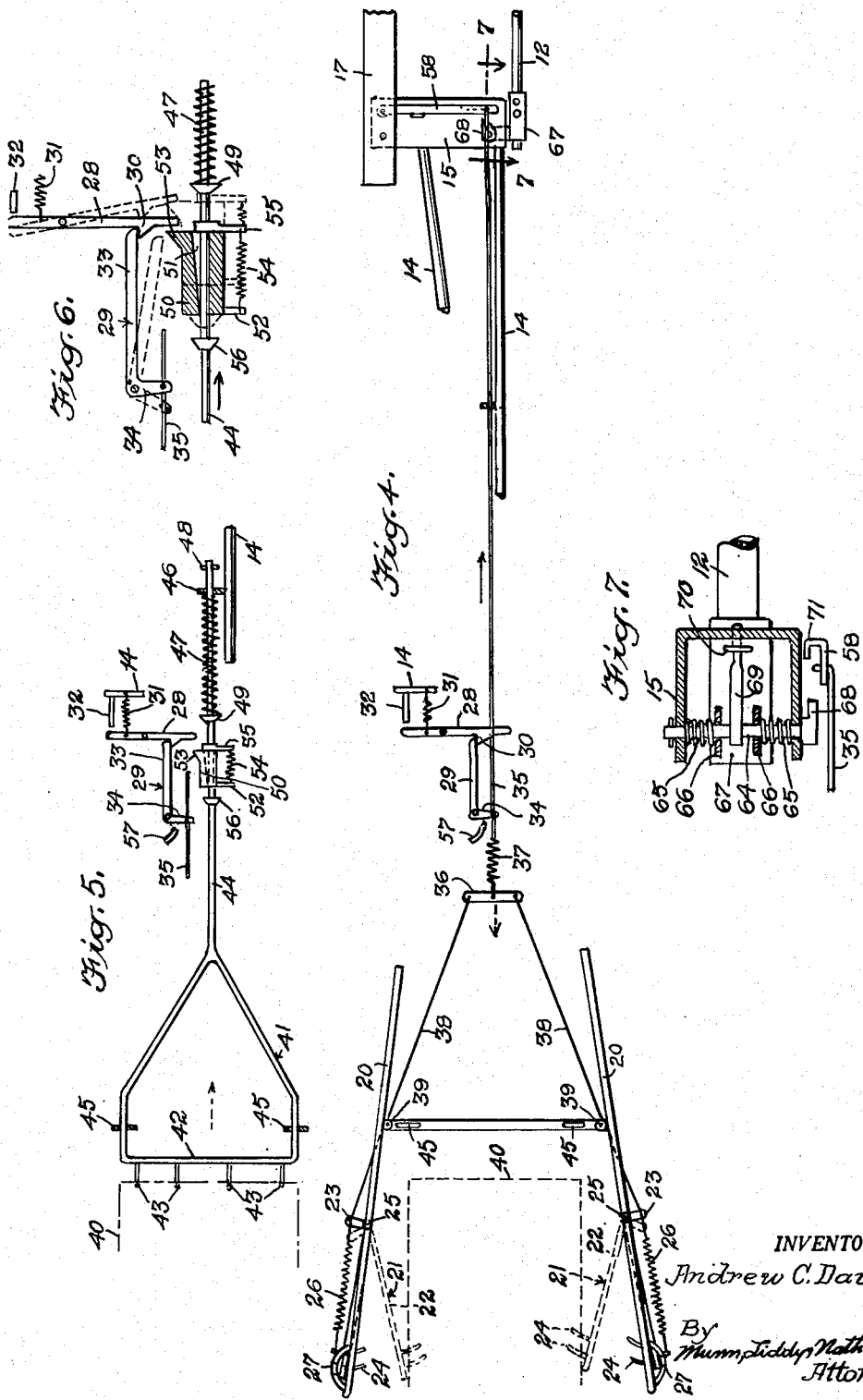
INVENTOR.
Andrew C. David
By
Mumm, Liddy, Nathanson
Attorneys March 15, 1955  A. C. DAVID  2,704,164
BALE LOADING ATTACHMENT FOR VEHICLES
Filed Dec. 11, 1952  4 Sheets-Sheet 4
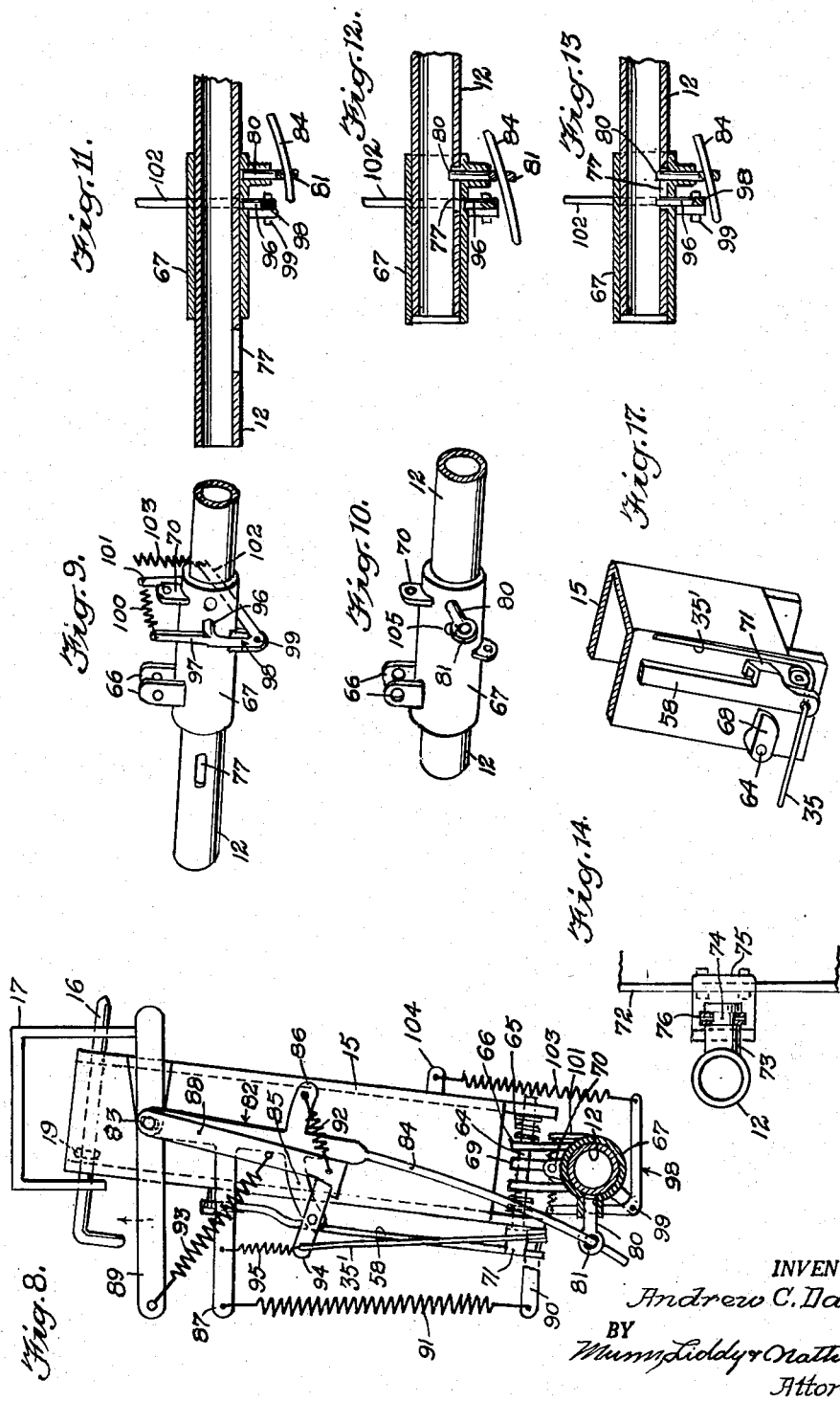
INVENTOR.
Andrew C. David
BY
Munn, Liddy & Nathanson
Attorneys

United States Patent Office 2,704,164
Patented Mar. 15, 1955

2,704,164

BALE LOADING ATTACHMENT FOR VEHICLES

Andrew C. David, Durham, Kans.

Application December 11, 1952, Serial No. 325,430

17 Claims. (Cl. 214—358)

This invention relates to a loading attachment applicable to an automobile truck and the like, and which may be used advantageously for picking up bales and loading them aboard the truck.

More particularly, this invention relates to a mobile vehicle loading attachment designed and adapted to pick up and load aboard the vehicle, bales or the like, one at a time, wherein the bales are spaced apart from each other on the ground, and wherein the attachment operates in response to the pressure exerted by each bale as the vehicle travels forwardly in the loading operation.

The principal object of the present invention is the provision of an attachment of the indicated character which is simple, practical and efficient; and one which is readily attachable to and detachable from a conventional automobile truck without requiring extensive and costly alterations.

Another object of this invention is the provision of a bale loading attachment which is designed and adapted to be attached to a motor vehicle at the driver's side of the vehicle, so that the driver's vision will not be obstructed in any way while operating the vehicle in the usual manner, thereby enabling the driver to properly steer the vehicle and easily pick up a load and dump the same onto the vehicle.

With the foregoing and other objects in view, the invention resides in the combinations, construction, arrangement and operation of the parts as hereinafter described, and as illustrated in the accompanying drawings, in which:

Fig. 1 is a side elevational view of a loading attachment embodying the present invention attached to an automobile truck, the truck being shown partly in full lines and partly in dot-and-dash lines, and the loader unit being shown in full lines in its loading position and in dotted lines in a partly raised position, and in dot-and-dash lines in its unloading position, dumping a load also shown in dotted lines.

Fig. 2 is a top plan view of the loader unit.

Fig. 3 is a side elevational view of the loader unit and parts of the mechanism for raising and lowering the unit, parts of the unit being shown in dotted lines in a raised position and illustrating features of the gripper releasing means.

Fig. 4 is a schematic plan view showing the load grippers and the means for releasably latching the grippers in non-gripping relation, the grippers being shown in a gripping relation in dotted lines.

Fig. 5 is a fragmentary schematic plan view showing the gripper latch releasing means.

Fig. 6 is an enlarged side elevational and part sectional view of the gripper latch, parts being shown in dotted lines in releasing or unlatching relation.

Fig. 7 is a detail sectional view taken on the line 7—7 of Fig. 4.

Fig. 8 is a side view of the mechanism for actuating the primary and secondary coupling pins with respect to the pitman which operates the loading unit; the primary coupling pin being shown retracted.

Fig. 9 is a fragmentary perspective view of the secondary coupling pin actuating means.

Fig. 10 is a fragmentary perspective view showing a portion of the pitman and its coupling sleeve.

Figs. 11, 12 and 13 are fragmentary sectional views showing different positions of the primary and secondary coupling pins in relation to the pitman and its coupling sleeve.

Fig. 14 is a detail sectional view of the means for detachably connecting the pitman with one of the road wheels of the automobile truck.

Fig. 15 is a fragmentary side view of the loading frame and parts for actuating the gripper latch, and other parts for connecting the pitman coupling sleeve to the loading frame arm.

Fig. 16 is an end view showing certain parts appearing in Fig. 15.

Fig. 17 is a fragmentary perspective view of the loading frame arm and associated parts.

Generally stated, the attachment of the present invention comprises a loading unit 10 which is pivotally connected with an automobile truck or the like 11 for movement between a lowered inclined load receiving position and a raised substantially vertical discharging position, and motion transmission means for operating said unit, said means in the present instance being a pitman 12 operatively coupled to the unit 10 and a road wheel 13 of the truck by means and in a manner hereinafter described.

The unit 10 includes a frame 14 which is substantially V shape in plan view as shown in Fig. 2. The rear end of the frame 14 has a short upstanding arm 15 of channel or other construction. The upper end of the arm 15 is connected by a pivot 16 with a channel bracket 17 rigidly secured to the deck or platform 18 of the truck on the under side of the deck at the front end and left side thereof. The pivot 16 projects through the flanges of the arm 15 and bracket 17. A removable clip 19 on the pivot prevents accidental withdrawal of the pivot. The pivot 16 is disposed at an oblique angle, the angularity being slightly rearwardly and upwardly with respect to the longitudinal axis of the truck. By reason of such disposition of the pivot 16, the frame 14 in its lowered position is disposed along the left side of the truck, and said frame as it is being raised moves obliquely thereby bringing the front end of the frame in its raised position directly over the deck 18, as illustrated in Fig. 1.

The frame 14 embodies forwardly diverging spaced bars or rods 20. Cooperative load grippers 21 are employed on the rods 20 respectively. Each of the grippers 21 is of substantially L shape providing a long arm 22 and a short arm 23 joined to the rear end of the arm 22. The arm 22 has a plurality of spikes or tines 24 on the front end extending laterally inward. Each gripper 21 is pivotally connected with the related rod 20, as at 25. A helical retractile spring 26 is connected with the arm 23 and a buffer 27 on the rod 20, said spring 26 causing the gripper to move into a gripping position, as indicated in dotted lines in Fig. 4.

In order to releasably latch the grippers 21 in their non-gripping relation, there is provided mechanism presently to be described. Use is made of a latch comprising cooperative levers 28 and 29 fulcrumed on the frame 14. The lever 28 has a beveled projection 30, and is also under the influence of a spring 31 connected with the lever and the frame 14. A stop 32 on the frame 14 limits the movement of the lever 28 into a latching position. The lever 29 is of the bell-crank type providing arms 33 and 34, respectively. The arm 34 is connected with a steel rod 35 which has one end thereof connected with an evener bar 36 by a strong helical contractile spring 37. Cables 38 are connected with the opposite ends of the bar 36 respectively and the arms 23 respectively of the grippers 21. These cables 38 move in contact with suitable guide pulleys 39 on the frame 14. The spring 37 is stronger than the combined strength of the two springs 26. When the latch is released in the movement of the lever 28, the spring 37 through the intervention of the cables 38 allows the grippers 21 to move into a gripping engagement with the load, such as a bale of hay, which is designated by the numeral 40. The spring 37 serves also as a shock absorber with cushioning effect when the grippers are snapped apart in the unloading or discharging operation. The buffers 27 also cushion the grippers in their return movement.

In order to operate the gripper latch to decrease the pull on the parts 35—38 to thereby enable the grippers 21 to grip a bale when the unit 10 is in its lowered position and the truck is traveling forwardly, there is provided means as follows: Use is made of a fork 41 comprising a head 42, curved spikes or tines 43 on the head projecting forwardly therefrom, and a rod 44 on the head projecting rearwardly therefrom. Portions of the head 42 extend through guides 45 on the frame 14, and the rod 44 extends through a guide 46 also on the frame 14, whereby the fork has guided movement forward and rearwardly with respect to the gripper latch lever 28, as shown in Fig. 5. A helical compression spring 47 surrounds the rod 44 and has its opposite ends in engagement with abutments 46 and 49, respectively, on the frame 14 and rod 44, respectively. A stop 48 on the rod 44 engageable with the abutment 46 limits forward movement of the fork 41. A collar 50 is slidable on the rod 44, and said collar is also rockable on the rod by reason of a tapering bore 51 in the collar. An arm 52 is secured to or formed on the front end of the collar 50, and a cam 53 is formed on the rear end of the collar. A helical retractile spring 54 is interposed between and connected with the arm 52 and an arm 55 secured to the rod 44. The spring 54 counteracts the downward rocking movement of the collar 50. The rod 44 has a fixed abutment 56 thereon in normally spaced cooperative relation to the collar 50. It will now be understood that when the fork 41 is forced rearwardly by the inertia of the bale as the truck travels forwardly, the abutment 56 will encounter and push the collar 50 rearwardly on the rod 44. At the same time the spring 47 will be compressed by the abutment 56. As the collar 50 slides rearwardly, the cam 53 will encounter the lower end of the lever 28 and swing it rearwardly. As a consequence, the projection 30 will be disengaged from the arm 33 of the lever 29 releasing the latter, thereby decreasing the tension of the spring 37, and so making it possible for the springs 26 to cause the grippers 21 to grip the bale 40 at the opposite sides thereof, as indicated in dotted lines in Fig. 4. A stop 57 on the frame 14 limits the clockwise movement of the lever 29 upon engagement of the arm 34 with the stop 57. Upon return or forward movement of the fork 41 by the action of the spring 47, the collar 50 rocks downwardly with respect to the rod 44 as the collar moves with the rod, thereby enabling the projection 30 to clear the lower end of the lever 28. After the projection 30 has cleared, the spring 54 returns the collar 50 to its normal relation to the rod 44.

In order to disengage the grippers 21 from the bale 40 when the unit 10 reaches its vertical unloading position, there is provided a lever 58 which is fulcrumed, as at 59, on the arm 15. The rod 35 is secured to the lower end of the lever 58. As the unit 10 reaches its vertical position, the lever 58 encounters an abutment 60 on the bracket 17 which causes a pull downwardly on the rod 35 which, in turn, causes the disengagement of the grippers 21 from the bale, through the intervention of the spring 37, bar 36 and cables 38. The bale 40 may then drop onto the deck 18 of the truck. At the same time the lever 29 is pivoted counterclockwise by the rod 35, and in a wiping action the arm 33 snaps past the projection 30 into engagement therewith which latches the grippers 21 in their non-gripping relation.

For the purpose of cushioning the inertia of the loader unit 10 when it reaches its vertical position, there is provided a shock spring 61 fixed to an abutment 62 on the arm 15, the spring being engageable with an abutment 63 on the bracket 17.

In order to insure the re-engagement of the latch lever 29 with the lever 28, regardless of the speed or inertia of the unit 10, there is provided means as follows. A shaft 64 is supported by the flanges of the arm 15 and tensioned by springs 65 on the shaft 64 between said flanges and spaced ears 66 on one end of a sleeve 67. The shaft 64 extends through the ears 66 by which the sleeve is connected with the arm 15 and has pivotal movement with respect thereto. The shaft 64 has a cam 68 on one end adjacent the lever 58. A crank arm 69 on the shaft 64 is loosely received in a hole in a lug 70 on the sleeve 67 in longitudinally spaced relation to the ears 66. The lever 58 on the end thereof remote from the pivoted end has a cross-sectionally curved cam follower 71 which cooperates with the cam 68 in the rocking movement of the sleeve 67 as the latter functions in the operation of the unit 10 as hereinafter described.

It will be understood that if the lever 58 is not moved sufficiently by reason of its engagement with the abutment 60 to properly or to effectually perform the gripper latching operation, such operation will be performed by the parts 64—71. In this connection it is obvious that the relative movements of the arm 15 and the sleeve 67 will cause the cam 68 to operate the lever 58 for the stated purposes.

In the operation of the unit 10, the power effort to produce the required motion is transmitted to the arm 15 from the wheel 13 through the intervention of the pitman 12 and the sleeve 67 and means hereinafter described. One end of the pitman 12 is detachably connected with the rim 72 of the wheel. For this purpose the pitman on one end has a journal 73 having a circular groove 74. A lug 75 is attached to the rim 72. The journal 73 fits in a hole in the lug 75 and a removable spring clip 76 is engageable in the groove 74 adjacent the lug 75 to complete the connection as shown in Fig. 14. The pitman has a longitudinal slot 77 therein near its other end, and this end portion of the pitman extends loosely into the sleeve 67, as in Figs. 9–13. On reference to Fig. 8 it will be seen that use is made of a primary coupling pin 80 carried by the sleeve 67 and movable into and out of the slot 77 when the latter is in registry with the pin 80. This pin has an eye 81 on its outer end. A lever 82 is fulcrumed on the arm 15 by a pivot 83. The lever 82 has arms 84, 85, 86 and 87. The arm 84 is curved and extends through the eye 81. The arms 85 and 87 project laterally from one side of the lever and the arm 86 projects laterally from the opposite side of the lever. Levers 88 and 89 are fulcrumed on the pivot 83. The lever 89 is disposed below the bracket 17 near the latter. The arm 87 of the lever 82 is connected with a fixed arm 90 on the frame 14 by a spring 91. The arm 86 is connected with the lever by a spring 92. A spring 93 is interposed between and connected with the levers 88 and 89. A trigger 94 is pivoted as at 95 on the arm 85. One end of the trigger 94 is connected with the arm 87 by a spring 95, and the other end of the trigger is movable into and out of engagement with the lower notched end of the lever 88. The lower end of the lever 58 is connected by a cable 35' to the trigger 94 to actuate it upon the release of the gripper latch upon operation of the fork 41 by a bale in the forward travel of the truck. The provision and arrangement of parts is such that when the loader unit 10 is down, one end of the lever 89 is in contact with the bracket 17, while the trigger 94 is out of engagement with the lever 88, thereby keeping the pin 80 in the out position, through the intervention of the lever 82, spring 92, lever 88 and spring 93. This spring 93 is stronger than either of the springs 91 or 92. After the unit 10 has raised a short distance the lever 89 moves out of contact with the bracket 17 thereby relieving the lever 89 of pressure and also nullifying the influence of the spring 93. As a result the spring 91 acting on the arm 87 causes the lever 82 to swing to the left which causes the arm 84 to push the pin 80 into the slot 77 when brought into registration by reason of the forward stroke of the pitman 12. As the wheel 13 continues to turn the unit 10 is raised into its vertical unloading position at the end of approximately one-half of a one revolution of the wheel.

In actual practice, the loader unit 10 rises and falls according to contours of the field, consequently the frame 14 is apt to be in any one of a number of possible positions when the primary pin 80 is engaged in the slot 77. It therefore is desirable to use a secondary coupling pin 96 on one arm 97 of a bell-crank lever 98 fulcrumed as at 99 on the sleeve 67. A helical retractile spring 100 is connected with the arm 97 and a fixed arm 101 on the sleeve 67. The other arm 102 of lever 98 is connected by a spring 103 to a fixed lug 104 on the arm 15. The pin 96 is movable into and out of the slot 77 through a hole 105 in the sleeve 67. See Figs. 8–13. The secondary pin 96 engages in the slot 77 after the primary pin 80 has been so engaged and after the unit 10 has started to raise. The pin 96 is disengaged from the slot 77 before the loader unit reaches its down position. When the unit 10 is down the angular relation of the arm 15 and sleeve 67 is such that the spring 103 is under tension causing the lever 98 to move into a position in which the pin 96 is out of the slot 77. After the unit 10 is raised a short distance there is a change in the angular relation of the arm 15 and sleeve 67, such that the tension of the spring 103 is relaxed, thereby enabling the spring 100 to move the lever 98 into its other position causing the pin 96 to enter the slot 77.

In Fig. 11 both pins 80 and 96 are out in which event the pitman 12 may idle back and forth. In Fig. 12 the pin 80 is shown projected into the slot 77 as the pitman is on a forward stroke or shortly prior thereto. In Fig. 13 both pins 80 and 96 are shown projected into the slot 77, the pin 96 having been projected into the slot momentarily after the projection of pin 80.

The pin 96 takes up "play" of the pin 80 and keeps the latter from sliding back and forth. The use of a slot 77 prevents faulty operation, when for instance the unit 10, due to uneven road surface, is raised above its lowest position and the pitman 12 is on its rearward stroke approaching rear dead center, the pin 80 entered in the slot cannot pull the unit 10 downwardly and possibly bend the frame 14. Hence the use of the pin 96 is important, because by entering the slot 77 after the pin 80 has entered, lost motion or "play" is taken up with the result that the unit 10 operates properly under somewhat adverse conditions.

It will be understood that the pitman 12 is coupled to the sleeve 67 for the operation of the loader unit 10 only if and when a bale is encountered; that the loading operation is automatic; and that the attachment may be readily applied to a vehicle by merely applying the pivot pin 16 and the clip 76 and the attachment may be detached by removing the pin 16 and clip 76.

The present invention is not restricted to the embodiment thereof illustrated and described, as details of construction may be modified and rearranged in accordance with the scope of the invention as defined in the appended claims.

I claim:

1. In a vehicle loading attachment, a loader frame swingable up and down between a load receiving lowered position and a load discharging raised position, said frame having spaced side bars, load grippers mounted on the forward end portions of said bars respectively for pivotal movement between the bars toward and away from each other into a cooperative gripping relation and a non-gripping relation, resilient means connected with the bars and said grippers which move the grippers into their gripping relation, means on the frame which releasably holds the grippers in their non-gripping relation, and means on the frame operated by the inertia of the load and forward travel of the attachment which operates said releasable means, whereby said grippers may be moved into their gripping relation by said resilient means.

2. In a vehicle loading attachment as set forth in claim 1, wherein said last means comprises an evener bar, cables connected with the opposite ends respectively of said evener bar and said grippers respectively, a contractile spring stronger than said resilient means, said spring being connected between portions of an additional cable which has one end thereof connected with said evener bar, a lever connected with the rear end of said additional cable, and a fixed resilient abutment which cooperates with said lever.

3. In a vehicle attachment for loading bales aboard the vehicle, a loading frame movable between a lowered and a raised position, and mechanism for operating said frame, said mechanism including a sleeve connected with the frame, a pitman, coupling means operated by a bale during the forward travel of the attachment to couple the pitman to the sleeve when the frame is lowered, and a fixed abutment cooperating with said coupling means to uncouple the pitman from said sleeve as the frame is being lowered and just prior to the time the frame reaches its lowered position.

4. In a vehicle attachment as set forth in claim 3, wherein said coupling means includes a coupling pin carried by the sleeve and movable into and out of a longitudinal slot in the pitman.

5. In a vehicle attachment as set forth in claim 3, and an arrangement of spring actuated levers having a common fixed fulcrum, one of said levers engaging said pin, and another one of said levers engaging said fixed abutment when frame is lowered.

6. In a vehicle attachment as set forth in claim 3, a pivot pin, means to fix the pivot pin in an oblique position extending loosely through an arm on one end of said loader frame by which the latter has pivotal movement between the lowered and raised position.

7. In a vehicle attachment as set forth in claim 3, wherein said loader frame embodies spaced guide bars on its front end, cooperative bale grippers on said bars respectively, springs connected with said bars and grippers biased to cause gripping action of the grippers, and means operated by a bale in the forward movement of the attachment and the movement of the loader frame, to perform the following functions, namely, to cause the grippers to grip a bale while said frame is in its lowered position; to disengage the grippers from the bale when the frame is in its raised position; and to releasably hold the grippers in a disengaged relation during the return movement of the frame.

8. In a vehicle attachment for loading bales aboard the vehicle, a loading frame movable between a lowered and a raised position, spring actuated bale grippers cooperatively mounted on said frame for lateral movement toward and away from each other, a latching device on said frame for retaining said grippers in non-gripping relation while the frame is in its lowered position, bale operated means on the frame to operate the latching device to enable the grippers to grip the bale while the attachment is traveling forward and the frame is in the lowered position, and means connected with the latching device operated by the movement of the frame into its raised position to retract the grippers to release the bale and cause the latching device to again retain the grippers in their non-gripping positions during return movement of the frame.

9. In a vehicle loading attachment, a frame having means for gripping and releasing a load, said frame being swingable between a load receiving lowered position and a load discharging raised position, and motion transmission mechanism connected with said frame for swinging the frame alternately up and down at intervals between periods during which the frame is at rest in its lowered position, said transmission mechanism comprising a pitman, a sleeve pivotally connected with said frame, said pitman having one end thereof extending loosely through said sleeve, and means cooperating with said pitman and sleeve and operable to couple the pitman to the sleeve and to uncouple the pitman therefrom.

10. In a vehicle attachment for loading bales aboard the vehicle, a loading frame movable between a lowered and a raised position, spring actuated bale grippers cooperatively mounted on said frame, a latching device on said frame for retaining said grippers in non-gripping relation while the frame is in its lowered position, bale operated means on the frame to operate the latching device to enable the grippers to grip the bale while the attachment is traveling forward and the frame is in the lowered position, and means connected with the grippers operated by the movement of the frame into its raised position to retract the grippers to release the bale and cause the latching device to again retain the grippers in their non-gripping positions during return movement of the frame, said latching device including an evener bar, cables connecting the opposite ends respectively of said bar with said grippers respectively, a spring actuated lever, and a spring actuated pivoted catch which cooperates with said lever.

11. In a vehicle loading attachment, a frame having means on the front end for gripping and releasing a load, an upstanding arm on the rear end of the frame, a pivot extending through the upper end of said arm so that the frame is swingable between a load receiving lowered position and a discharging raised position, and motion transmission mechanism connected with the lower end of said arm for swinging the frame alternately up and down at intervals between periods during which the frame is at rest in its lowered position, said transmission mechanism comprising a pitman, a sleeve pivotally connected with said arm, said pitman having one end thereof extending loosely through said sleeve, and means cooperating with said pitman and sleeve and operable to couple the pitman to the sleeve and to uncouple the pitman therefrom.

12. In a vehicle loading attachment as set forth in claim 11, wherein said pivot extends obliquely through said arm.

13. In a vehicle loading attachment as set forth in claim 11, wherein said last mentioned means includes a slidable pin on said sleeve which is movable into and out of a longitudinal slot in said pitman.

14. Motion transmission mechanism comprising a pitman, a sleeve into which one end of said pitman loosely extends, a pin carried by said sleeve and movable into engagement with the pitman to couple the pitman to the sleeve, said pin being movable out of engagement with the pitman to uncouple the pitman from the sleeve, means to operate the pin for the stated purposes, the end of the pitman remote from the sleeve having a journal with a circular groove, and a clamping element removably engageable with said journal and groove to drivingly connect the pitman to a suitable driver.

15. Motion transmission mechanism as set forth in claim 14, wherein said pin is movable transversely of said sleeve, and said pitman has a longitudinal slot therein for the engagement of said pin with said pitman.

16. Motion transmission mechanism as set forth in claim 14, wherein said means for operating the pin consists of a spring actuated lever.

17. Motion transmission mechanism comprising a pitman, a sleeve into which one end of said pitman loosely extends, a pin carried by said sleeve and movable into engagement with the pitman to couple the pitman to the sleeve, said pin being movable out of engagement with the pitman to uncouple the pitman from the sleeve, means to operate the pin for the stated purposes, the end of the pitman remote from the sleeve having means for drivingly connecting the pitman to a suitable driver, a pivoted arm, and means pivotally connecting said sleeve to said arm whereby the arm is given pivotal movement by the sleeve when the latter is coupled to said pitman by said pin during the operation of the pitman.

References Cited in the file of this patent

UNITED STATES PATENTS

| Number | Name | Date |
|---|---|---|
| 872,459 | Satre | Dec. 3, 1907 |
| 1,278,100 | Bruning | Sept. 10, 1918 |
| 1,452,679 | Fisher | Apr. 24, 1923 |
| 1,539,803 | McDaniel | May 26, 1925 |
| 1,841,682 | Schroeder | Jan. 19, 1932 |
| 2,050,546 | Schuessler | Aug. 11, 1936 |
| 2,182,838 | Bennett | Dec. 12, 1939 |
| 2,225,787 | McDermott et al. | Dec. 24, 1940 |
| 2,241,308 | Koivu | May 6, 1941 |
| 2,321,630 | Shippee | June 15, 1943 |
| 2,531,070 | McDermott | Nov. 21, 1950 |
| 2,634,003 | Williamson et al. | Apr. 7, 1953 |
| 2,656,058 | Foote | Oct. 20, 1953 |